(12) United States Patent
Kjær (10) Patent No.: US 12,465,952 B2
(45) Date of Patent: Nov. 11, 2025

(54) FOOD PROCESSING DEVICE

(71) Applicant: MAREL SALMON A/S, Stovring (DK)

(72) Inventor: Anders Kjær, Aabybro (DK)

(73) Assignee: MAREL SALMON A/S, Stovring (DK)

( * ) Notice: Subject to any disclaimer, the term of this patent is extended or adjusted under 35 U.S.C. 154(b) by 642 days.

(21) Appl. No.: 17/427,590

(22) PCT Filed: Feb. 6, 2020

(86) PCT No.: PCT/EP2020/052976
§ 371 (c)(1),
(2) Date: Jul. 30, 2021

(87) PCT Pub. No.: WO2020/161231
PCT Pub. Date: Aug. 13, 2020

(65) Prior Publication Data
US 2022/0118483 A1   Apr. 21, 2022

(30) Foreign Application Priority Data
Feb. 6, 2019  (EP) .................... 19155711

(51) Int. Cl.
*B07C 5/342* (2006.01)
*A22C 17/00* (2006.01)
*A23L 17/00* (2016.01)

(52) U.S. Cl.
CPC ........ *B07C 5/3422* (2013.01); *A22C 17/0073* (2013.01); *A22C 17/0093* (2013.01);
(Continued)

(58) Field of Classification Search
CPC ......... B07C 5/3422; B07C 5/342; B07C 5/36; B07C 2501/0081; A22C 17/0073;
(Continued)

(56) References Cited

U.S. PATENT DOCUMENTS 3,851,074 A    11/1974  Gillespie
7,976,368 B2   7/2011   Haucke et al.
(Continued)

FOREIGN PATENT DOCUMENTS

CL   2017000308 A1   11/2017
CL      202100734       3/2021
(Continued)

OTHER PUBLICATIONS

International Search Report and Written Opinion from PCT Application No. PCT/EP2020/052976, Apr. 14, 2020.
(Continued)

*Primary Examiner* — Michael McCullough
*Assistant Examiner* — Kalyanavenkateshware Kumar
(74) *Attorney, Agent, or Firm* — Workman Nydegger (57) ABSTRACT

A food processing device comprising a conveyor, a processor configured for receiving image data representing images of the food items, and a plurality of workstations arranged along the conveyor system. The avoid time consuming processing of food items, the processor is configured to provide a processing indicator which indicates whether the food items need further processing or not and the device comprises an identification structure configured to identify food items which are selected for further processing such that they are distinguished from food items not being selected for further processing based on the processing indicator.

14 Claims, 6 Drawing Sheets

(52) U.S. Cl.
CPC ...... *A23L 17/00* (2016.08); *B07C 2501/0081* (2013.01); *B65G 2201/0202* (2013.01)

(58) Field of Classification Search
CPC ... A22C 17/0093; A22C 17/008; A23L 17/00; B65F 2201/0202
See application file for complete search history.

(56) References Cited

U.S. PATENT DOCUMENTS

| | | | |
|---|---|---|---|
| 10,327,450 | B2 | 6/2019 | Petersen et al. |
| 10,925,289 | B2 | 2/2021 | Skraedderdal et al. |
| 2002/0067797 | A1* | 6/2002 | Safai ................ A22C 17/10 378/54 |
| 2008/0144880 | A1* | 6/2008 | DeLuca ................ G06T 7/20 382/100 |
| 2010/0029187 | A1 | 2/2010 | Haucke et al. |
| 2011/0054674 | A1* | 3/2011 | Thorsson ............... A22C 18/00 700/230 |
| 2012/0307013 | A1 | 12/2012 | Hjalmarsson et al. |
| 2016/0232656 | A1* | 8/2016 | Taylor ................... B07C 5/3422 |
| 2017/0245509 | A1 | 8/2017 | Petersen et al. |
| 2019/0029277 | A1 | 1/2019 | Skraedderdal et al. |

FOREIGN PATENT DOCUMENTS

| | | | |
|---|---|---|---|
| CN | 101194161 | A | 6/2008 |
| CN | 104624515 | A | 5/2015 |
| CN | 106793789 | A | 5/2017 |
| CN | 108697105 | A | 10/2018 |
| EP | 1939811 | A1 | 7/2008 |
| EP | 2353395 | A1 | 8/2011 |
| EP | 2503331 | A2 | 9/2012 |
| GB | 1431125 | A | 4/1976 |
| GB | 2472007 | A | 1/2011 |
| GB | 2472008 | A | 1/2011 |
| GB | 2472009 | A | 1/2011 |
| GB | 2477275 | A | 8/2011 |
| RU | 2320178 | C1 | 3/2008 |
| WO | 200243502 | A2 | 6/2002 |
| WO | 03077662 | A1 | 9/2003 |
| WO | 200843370 | A1 | 4/2008 |
| WO | 2009098171 | A1 | 8/2009 |
| WO | 201195998 | A1 | 8/2011 |
| WO | 2011138052 | A1 | 11/2011 |
| WO | 2016023557 | A1 | 2/2016 |

OTHER PUBLICATIONS

Extended Search Report from corresponding EP Application No. EP19155711.5, Jul. 23, 2019.
Office Action from corresponding Chinese Application No. 202080012055.8, Sep. 16, 2022.
Search Report from corresponding Chinese Application No. 202080012055.8, Sep. 8, 2022.
Search Report from corresponding Spanish Application No. 202101971, Jul. 27, 2021.

* cited by examiner

FOOD PROCESSING DEVICE

FIELD OF THE DISCLOSURE

The present invention relates to a food processing device comprising a conveyor system for conveying incoming food items in a conveying direction between an inlet and an outlet. An imaging system, e.g. arranged along the conveyor, captures image data of the incoming food items, and a processor in data communication with the imaging system is configured for processing the captured image data and for determining a processing indicator for each of the incoming food items. A plurality of workstations is arranged along the conveyor e.g. downstream in the conveying direction relative to the imaging system.

BACKGROUND

In modern food processing systems, different information related to the food is identified and recorded while the food is processed. By means of example, the origin, the weight, the size, and other characteristics may be recorded. In attempts to increase the quality of the final product, camera systems are used for identifying characteristics of the food, e.g. related to the colour, shape, or size of the food items. Such systems are normally used to index the food items, e.g. for labelling purposes or for defining specific sizes in portioning of the food item.

SUMMARY

It is an object of embodiments of the invention to provide improved logistics in food processing, and particularly to increase the processing speed, to reduce the workload, and to increase the efficiency in processing.

Accordingly, in a first aspect, embodiments of the present invention provide a food processing device wherein the processing indicator indicates whether the food items need further processing or not and wherein the device comprises an identification structure configured to identify selected food items such that they are distinguished from food items not being selected for further processing based on the processing indicator.

Accordingly, the invention facilitates distribution of food items based on a need for processing and as a result, only a part of the food items, i.e. objects with a specific need for processing, is forwarded to the processing station, e.g. for being re-worked by automatic or manual operations. This is expected to provide a significantly higher throughput since only those food objects that need to be further processed are processed and the remaining ones may bypass the processing stations. This provides the opportunity to set the level of the desired quality based on customer requirements without increasing the workload for all food items in general.

The conveyor system may comprise one or more separate conveyors, and it may be constituted by belts or any similar well known conveying structure for food items.

Food items herein could be any kind of substance to be consumed in support for an organism, examples include items of plant or animal origin, e.g. vegetables, meat, or fish, e.g. meat from poultry, beef or any similar kind of food.

The conveying direction is defined by the inlet and the outlet. The inlet and outlet could simply be where one of the conveyors of the conveyor system begins and ends.

The imaging system could be of any kind known in the art for process inspection in food industries, e.g. including thermal IR imaging systems, or cameras for normal visual spectrum, or X-ray cameras for the X-ray spectrum. Such cameras are well known in the art. The imaging system could be a part of the device in which case the imaging system is arranged along the conveyor system and configured for capturing image data of food items as they are conveyed by the conveyor system.

The image data is communicated to the processor which is configured to process the data and determine a processing indicator.

The process indicator, which is determined for each of the incoming food items, is an indicator which indicates a need for further processing. In one relatively simple implementation, the process indicator is a binary integer indicating yes or no, i.e. should be further processed or should not be further processed. In a more advanced implementation, the process indicator could be an integer e.g. from 1 to 10 where a higher number indicates a higher need for processing.

The process indicator could be defined based on different predefined identifiers in the food item. Below is a list of identifiers which could be used for defining the process indicator:

a) size of food item;
b) colour of food item;
c) colour variations in food item;
d) shape of food item;
e) a minimum fat content;
f) a maximum fat content; or
g) identifiable patterns in food item The above identifiers a)-f) may e.g. be defined within lower and upper limits. In the simple implementation, the food items are selected for further processing if outside the limits. In the more advanced implementation, the process indicator may increase in number when the difference between the desired size, colour, colour variation, or shape and the actual size, colour, colour variation or shape increases.

The above identifier g) may e.g. be defined based on a statistic value expressing the probability of having determined a specific item, e.g. a needle, a bone fragment, or similar undesired object in the food item. In the simple implementation, the food items are selected for further processing if the statistic value is outside predetermined limits. In the more advanced implementation, the process indicator may increase in number when the statistic value increases or decreases.

A plurality of workstations is arranged along the conveyor system. If the imaging system is a part of the device and located along the conveyer system, the workstations may be located downstream in the conveying direction relative to the imaging system. The workstations can therefore receive the food items after the image data has been captured. The workstations may include manual workstations configured for human operators to process the food items, it may include automatic workstations for machine processing of the food items, and it may be a combination between manual and automatic workstations.

Figure 7:
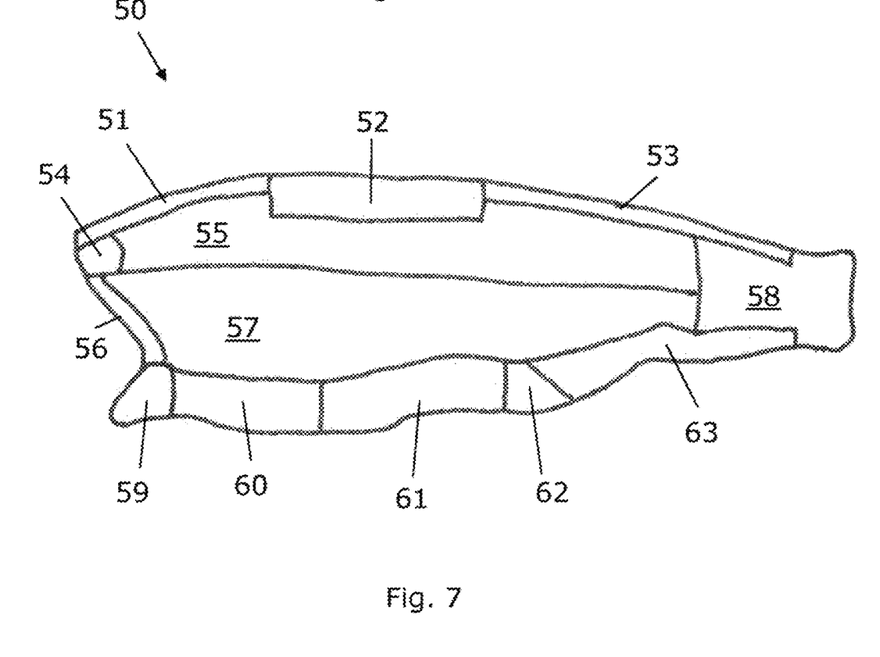
FIG. 7 illustrates some possible zones of a fish fillet to take into consideration when determining quality.

When determining the process indicator for an item this may be performed by analyzing for identifiers as e.g., mentioned herein in combination with different areas of the item. For salmon such areas may be as illustrated in FIG. 7. Thus, for each area a sub-indicator may be determined in respect of a number of identifiers, the sub-indicators may then be used to obtain an indicator for the entire food item in respect of no processing, further processing or discarding the food item.

Herein, we distinguish between the selection process and the identification process. The selection process is where food items are selected to be processed further and identification process is the process of ensuring that those food items which are selected can be distinguished from those food items not being selected.

The selection process could be carried out manually by human operators selecting to further process a food item based on the processing indicator or it may be handled by a machine.

One and the same processing indicator may have different results depending on the workload at the workstations. If the workload is low, a food item with a specific processing indicator may be selected for further processing, and if the work load is high, a food item with the same processing indicator may not be selected for further processing.

The identification structure could be an integrated part of the processor, or it could be controlled by the processor, or it could be a separate device, e.g. comprising a separate computer configured to identify food items which are selected for further processing and ensure that they are distinguished from food items not being selected for further processing.

The identification may e.g. include one or more of the below identification steps:
i) attachment of a tag to selected food items or use of stamps or similar marks directly on the selected food items,
ii) movement of the selected food items such that they are conveyed on a distinct location of a conveyor or moved to a separate conveyor, or
iii) use of light or similar electronically controlled identification means to illuminate or otherwise signal that a food item is selected for further processing.

The identification structure makes the identification based on the selection process which again is carried out based on the processing indicator.

Both the selection process and the identification process may be carried out automatically controlled by one or more computer devices, e.g. integrated into the processor which is in data communication with the imaging system.

In one embodiment, the imaging system is arranged along the conveyor system for capturing image data of the incoming food items and for transmitting the image data to the processor. In an alternative embodiment, the image date of the food items is captured elsewhere, i.e. before the food items enter the device.

The conveyor system may comprise at least one conveyor line extending along the workstations to allow items selected for further processing to be picked up by the workstations.

An object diverter may be configured to separate the food items selected for further processing from the other food items. The object diverter may e.g. be configured to move the food items selected for further processing on the conveyor line extending along the workstations such that the food items selected for further processing are located in one location on the conveyor line extending along the workstations and such that the food items not selected for further processing are located in another location on the conveyor line extending along the workstations. The object diverter may comprise a movable arm configured to move or guide the food items on the conveyor line.

The processor could be configured to appoint the selected food items to a selected workstation for the further processing. The appointment could be based on workload at the individual workstations or it could be based on a combination between specific skills of a workstation or an operator at a workstation and specific requirements related to the need for further processing, e.g. specific abilities for removing a certain bone fragment etc.

The workstations may have access to deliver food items at a common outlet. In one embodiment, the conveyor system comprises a first and a second conveyor line, the first conveyor line extending between the inlet and the outlet, and the second conveyor line extending adjacent to the first conveyor line and being arranged to receive food items which are selected for further processing from the first conveyor line. In this layout, the food items which are not selected may simply continue on the first conveyor line from the inlet to the outlet, and the selected food items may be identified by being moved to the second conveyor line where the workstations may pick up the selected food items, carry out the further processing, and place the finished food items back on the first conveyor line.

At least one of the workstations may be configured as a master workstation which has access to the processing indicator. The master workstation may therefore distribute the food items between the other workstations.

If the identification process includes the step of moving the selected food items to a distinct location on a conveyor line or to move the selected food items from one conveyor line to another conveyor line, the food processing device may use the aforementioned diverter. The diverter may be configured to separate the food items selected for further processing from the other food items. An activation controller may be configured to activate the object divert for selected food items based on the processing indicator for the selected food items and the pre-defined threshold value. In that case, the activation controller carries out the selection process automatically.

The object diverter may e.g. be configured to move food items from the aforementioned first conveyor line to the second conveyor line.

A guidance controller may be implemented for generating a processing guide for processing of the food items selected for further processing.

The guidance controller could be in data communication with the imaging system, and it could be configured to generate the processing guide based on the captured image data. In one example, the guidance controller is configured to provide audio or visual indication on a screen or directly on the food item to indicate whether the further processing is needed.

The processing guide may improve both the throughput and the yield. The throughput can be improved since the operator knows exactly what to do without needing to do his own inspection of the food item, and the yield can be improved since the processing guide may give an improved knowledge where to cut, e.g. in a trimming process.

The workstations could be in data communication with the guidance controller and configured for receiving the processing guide from the guidance controller. The workstations could e.g. be configured for manual processing of the food items and they may comprise an electronic display configured for visualising the processing guide.

The processing guide may comprise a cutting pattern defining trimming of the food items, and the guidance controller may be configured to generate a pattern of accepted food areas and rejected food areas on the food item based on the image data such that the workstation can carry out the trimming.

The guidance, and or the selection process could be driven by a customer generated requirement. Examples of a customer requirement may include those parameters mentioned already as identifiers which could be used for defining the process indicator. Accordingly, the customer may communicate a requirement related e.g. to one or more of
   a) size of food item;
   b) colour of food item;
   c) colour variations in food item;
   d) shape of food item;
   e) a minimum fat content;
   f) a maximum fat content; or
   g) identifiable patterns in food item These customer requirements may be communicated electronically into the processing device and used for the selection process.

In a second aspect, the invention provides a method of processing food items in a device comprising:
   a conveyor system for conveying incoming food items in a conveying direction between an inlet and an outlet;
   a processor configured for receiving image data representing images of the food items, the image data being received from an imaging system and the processor being configured for processing the image data for determining a processing indicator for each of the incoming food items based on the image data, the processing indicator indicating whether the food items need further processing or not; and
   a plurality of workstations arranged along the conveyor system.

The method comprises the step of using the processing indicator for selecting food items needing to be processed and identifying the selected food items from other food items on the conveyer system.

The step of identifying the selected food items may comprise the step of allocating the food items relative to the food items not being selected.

The method may comprise the step of processing the selected food items, e.g. by trimming the food items to remove unwanted parts, e.g. fat, bone, or cartilage etc.

The processing may be carried out in accordance with a processing plan prepared based on the image data.

When the selected food items are processed, they may be mixed with the food items which were not selected, i.e. the processed food item may leave the device at the outlet together with those food items which are not selected and therefore not processed.

DETAILED DISCLOSURE OF EMBODIMENTS

Figure 1:
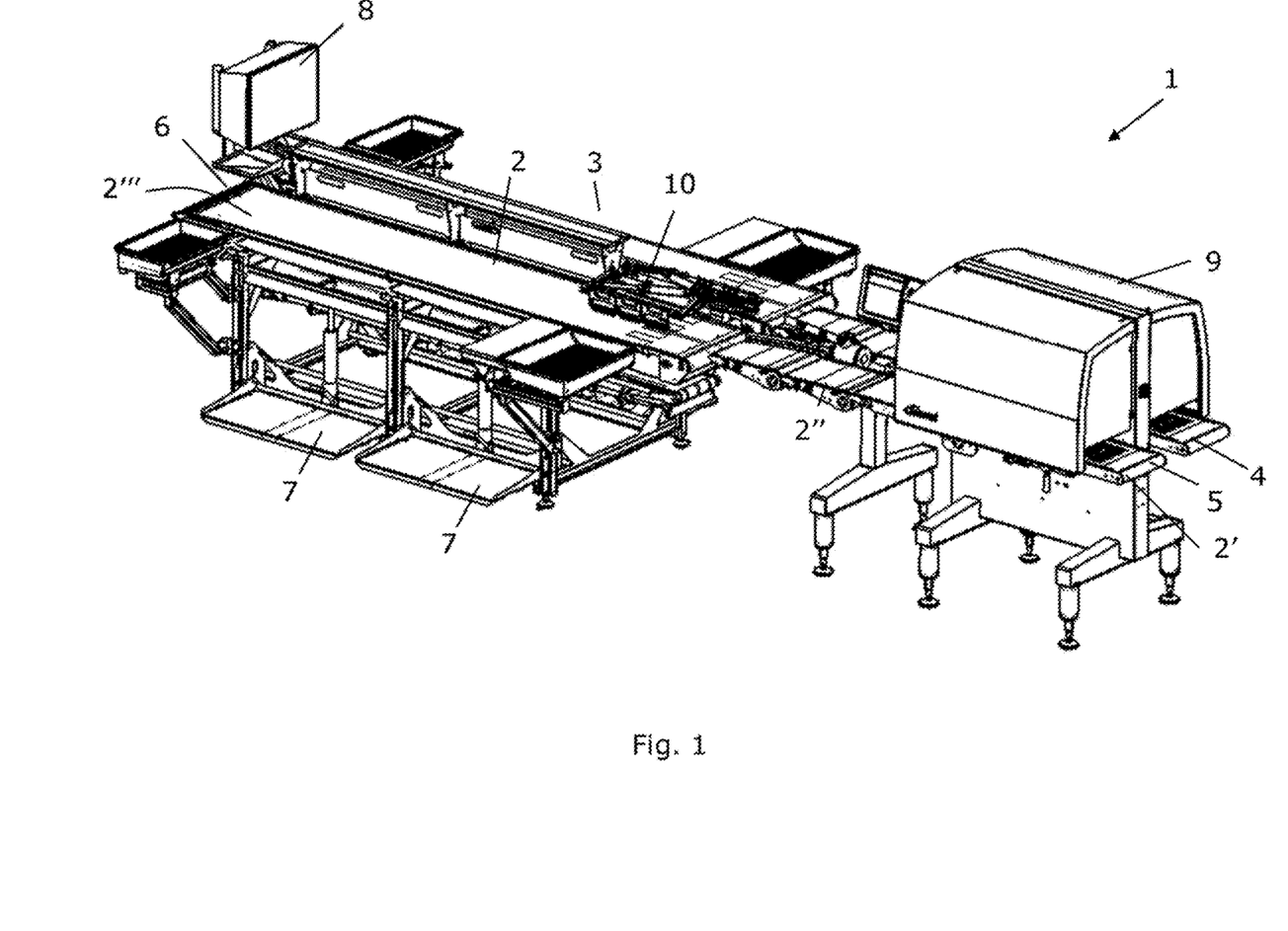
FIG. 1 illustrates a device according to an embodiment of the invention in a perspective view.

FIG. 1 illustrates a food processing device 1 comprising a conveyor system with a plurality of individual conveyor lines 2, 3, each having different sections 2', 2", 2'". The first conveyor line 2 forms inlets 4, 5 where incoming food items are received. In the disclosed embodiment, each of the two separate conveyor lines 2, 3 has its own inlet 4, 5. The incoming food items are conveyed from the first line segment 2' to the second line 2", and from the second line 2" to the third line 2'" until reaching the outlet 6. Food items which should be discarded can be discarded e.g. in second line section 2", where a conveyor belt e.g. makes an opening such that the food item to be discarded enters between the outfeed end of one conveyor belt and the infeed end of the following conveyor belt and the discarded food item can be collected under second line section 2". If processing salmon fillets, the food items received at the inlets 4, 5 may be salmon fillets after filleting, salmon fillets after filleting and trimming, or salmon fillets after the skinning process. Skinning is usually performed after filleting and trimming.

Workstations 7 are arranged along the conveyor system and allow operators to access the food items being conveyed and to process food items in need of being processed.

The processing may particularly be trimming where excessive fat is removed, or bone removal where unwanted fragments are removed from the food items.

The illustrated device is provided with workstations for manual operation. The workstations could also be automatic processing stations with no need for operators.

The processor 8 comprises a computer processing unit (CPU) and corresponding software code configuring the CPU. The processor is configured to receive image data from the imaging system 9 located upstream relative to the workstations.

The image data represents images of the food items, e.g. conventional pictures, e.g. colour pictures. The images could also include X-ray images or ultrasound images.

When the image data is received by the processor 8, it is converted into a processing indicator. In an alternative embodiment, the processor 8 is integrated in the imaging system 9.

The processing indicator for each of the incoming food items is based on the image data and indicates a need for processing of the food items.

In one embodiment, the processing indicator is a result of a comparison between an image of a desired end result for the food items and the image taken of a specific food item. The difference in the images is converted into an integer.

In another embodiment, the image data is processed to recognize characteristic features. Such characteristic features could be characteristic colours, characteristic shapes, e.g. characteristic boundary shapes of the food item, or characteristic shapes of undesired objects on or in the food items. Methods and devices for recognising characteristics in a picture are well known in the art. The discovery of one or more or the predefined characteristics may then trigger a processing indicator indicating a need for processing.

The device comprises an identification structure 10 in the form of a movable arm which can push food items to a particular location on the conveyor line.

When the selected food items are pushed to the same location at one side of the conveyor line, they are identified as food items needing to be processed, and the subsequent workstations can carry out the processing of those, such identified, food items.

The imaging system 9 captures pictures of the incoming food items and converts the pictures to image data. The image date is transmitted to the processor 8.

Figure 2:
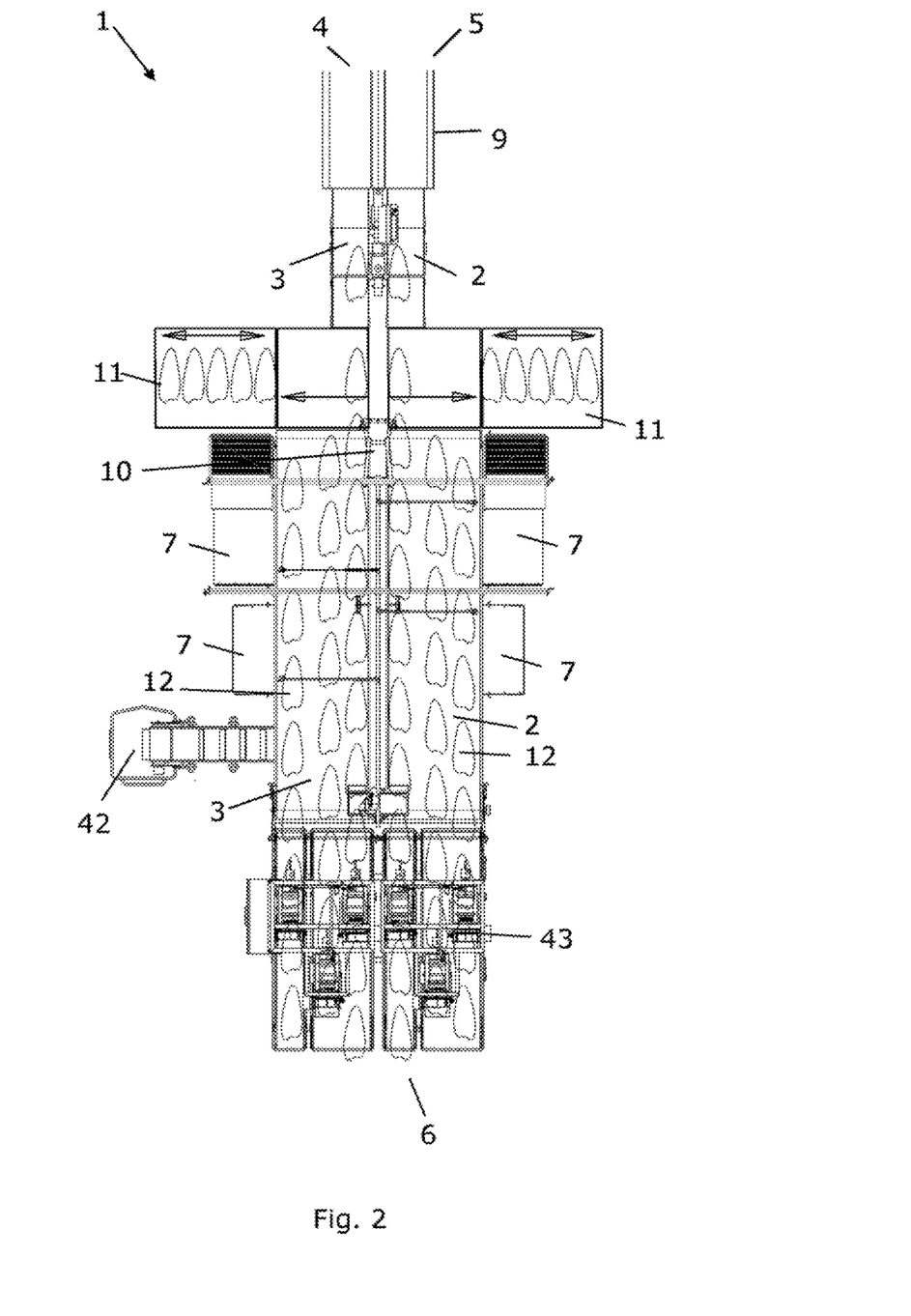
FIG. 2 illustrates the device in a top view.

FIG. 2 illustrates the device seen from above. In this view, it is more clearly seen that the device comprises two separate conveyor lines 2, 3 extending along the workstations. The conveyor lines operate in parallel, and the selected items of each of the conveyor lines are shifted to a specific location along the edge of each conveyor line. Accordingly, the operators at the workstations can easily identify the relevant food items and pick them up for processing. In the illustrated embodiment, the two conveyor lines are essentially identical, but in a mirrored layout.

The object diverter 10 is arranged after the imaging system but before the workstations in the flow direction between the inlet and outlet. The food items needing to be processed can therefore be separated from the food items not selected for processing before they arrive at the workstations. At least one object diverter can separate food items to be discarded from the food items selected for further processing and the food items selected for no further processing.

The object diverter moves the food items to the edge of the conveyor line. Since only the selected food items are moved to this location, they are easily identified.

An activation controller activates the object diverter based on the processing indicator. In the disclosed embodiment, the activation controller and the processor for determining the processing indicator are integrated in the same processor 8. Alternatively, one or both of the activation controller and the processor could be integrated in the imaging system 9.

In a more advanced implementation, the processor can appoint the selected food items to a specific one workstation of the plurality of workstations for the further processing of the selected food item. In this case, the device may comprise a plurality of object diverters each arranged in connection with a corresponding workstation such that selected food items can be guided to a selected workstation.

In the device illustrated in FIGS. 1 and 2, all workstations have access to deliver food items at one and the same outlet.

FIG. 2 illustrates that the device may comprise a storage section 11 where food items can be stored if the workstations 7 are not able to process them.

Figure 3:
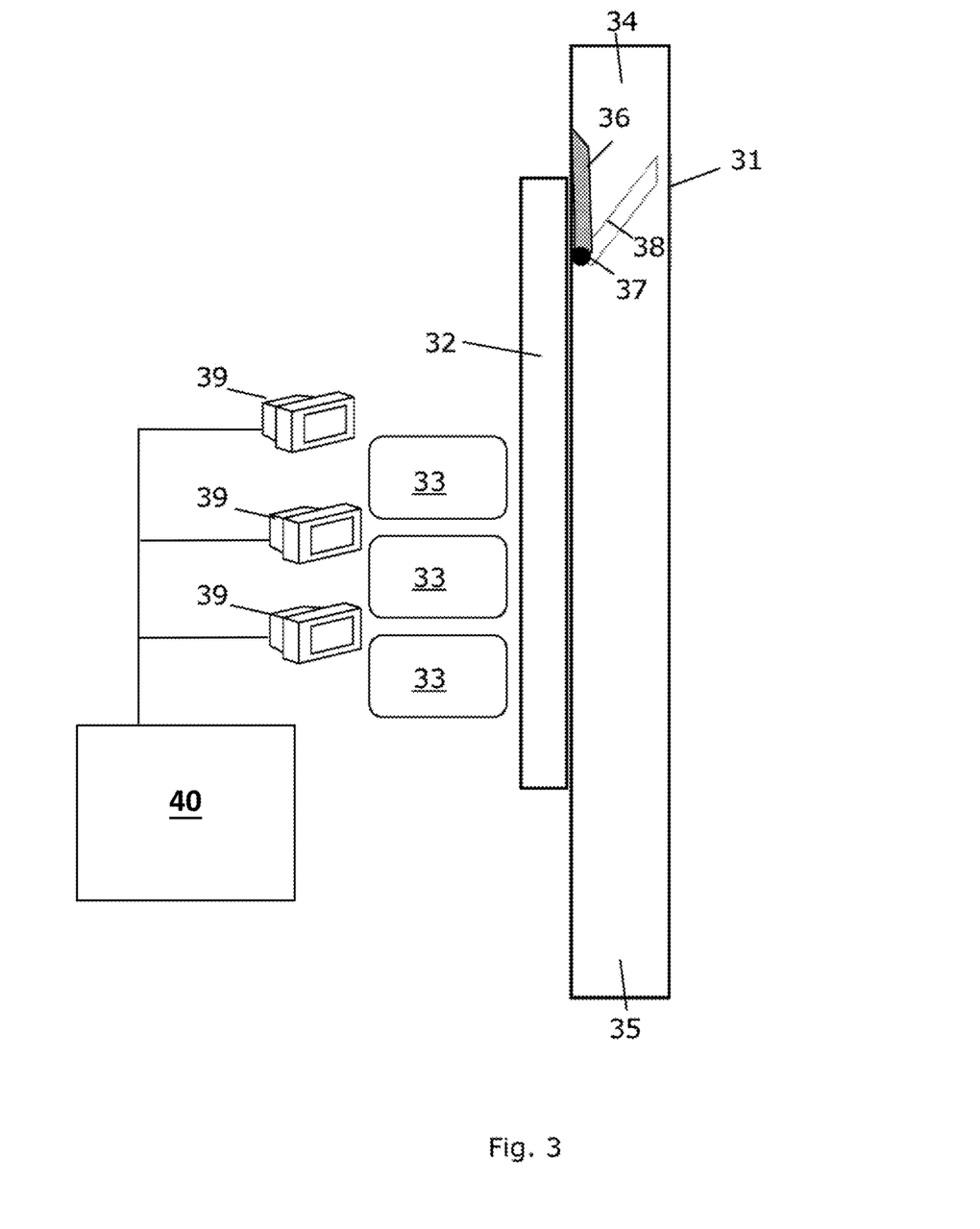
FIGS. 3 and 4 illustrate different embodiments of the device.

FIG. 3 illustrates a schematic view of an embodiment of the device where the conveyor system comprises a first conveyor line 31 and a second conveyor line 32. The two conveyor lines are located adjacently, and the workstations 33 are located along the second conveyor line.

The first conveyor line 31 extends between the inlet 34 and the outlet 35 and the second conveyor line 32 is arranged sufficiently close to the first conveyor line 31 to receive food items which are selected for further processing from the first conveyor line.

The workstations are further arranged such that they can release food items which have been processed further onto the first conveyor line where they are guided to the outlet.

In this embodiment, the object diverter 36 is hinged at 37 and configured to move to the position indicated by the shadow 38 and thereby move selected food items from the first conveyor line to the second conveyor line.

Figure 4:
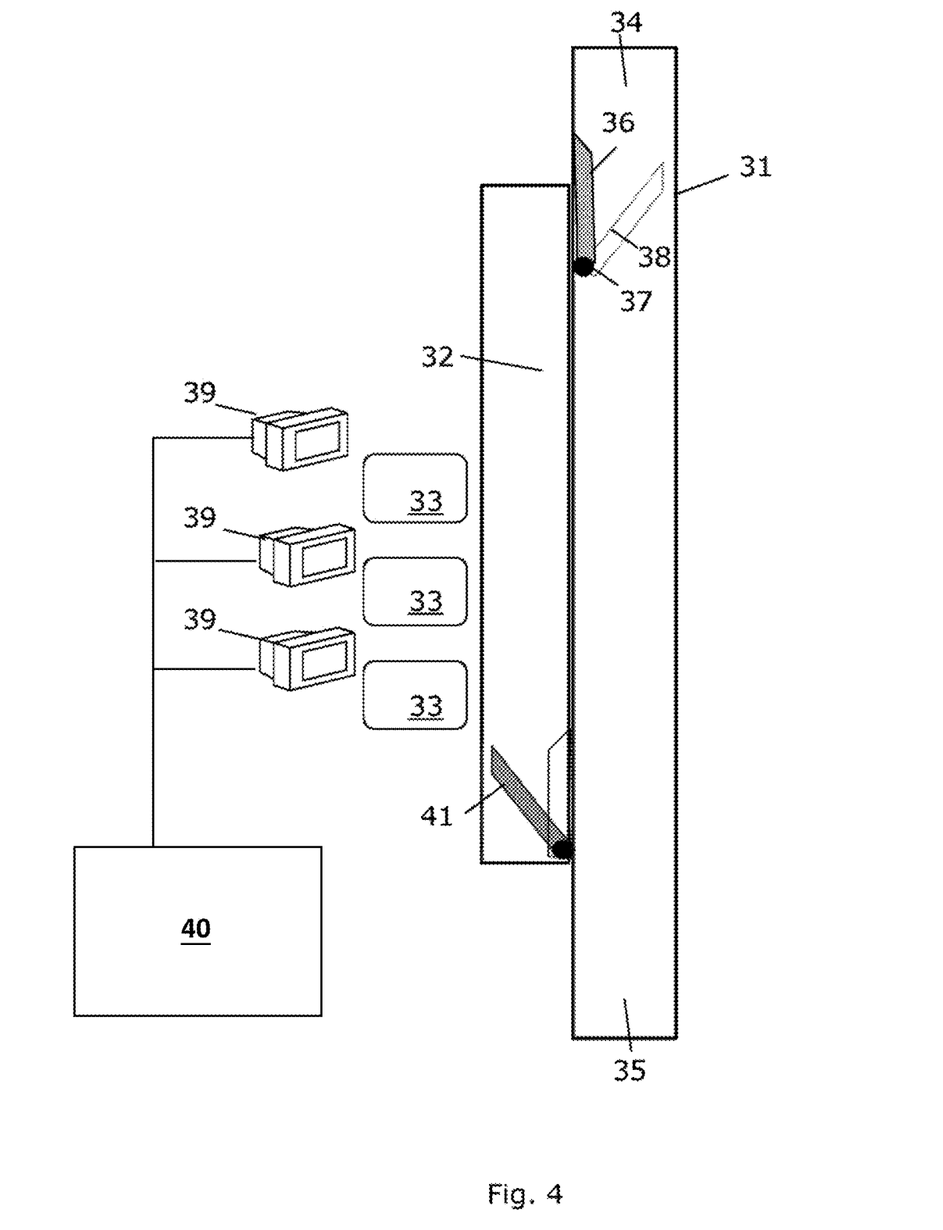

FIG. 4 illustrates an alternative embodiment, where the workstations at the second conveyor line are not sufficiently close to the first conveyor line to put the food items back on the first conveyor line, and in this embodiment, a second object diverter 41 at the end of the second conveyor line moves the processed food items back to the first conveyor line.

Figure 5A:
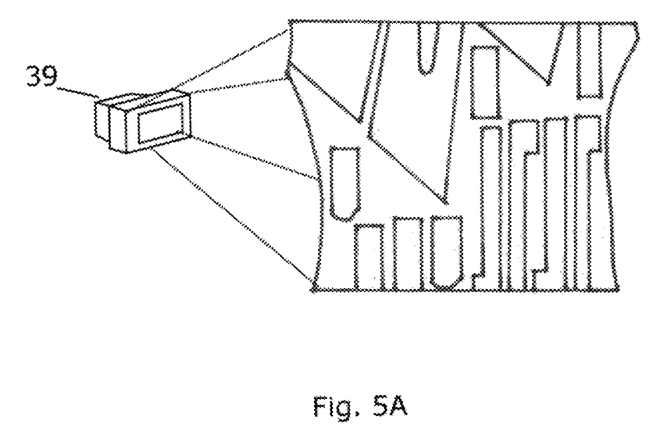
FIG. 5 illustrates cutting lines presented on a screen at a workstation as a processing guide.
Figure 5B:
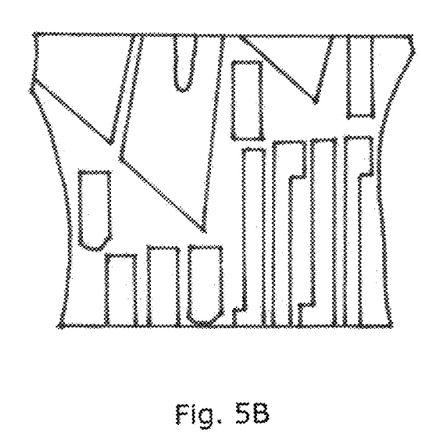

The monitors 39 illustrated on FIGS. 3 and 4 at each of the workstations are configured to receive data from a guidance controller 40. The data includes a processing guide for processing of the food items selected for further processing, e.g. including cutting instructions for trimming of food items, c.f. example in FIG. 5 where trim lines of a salmon filet is illustrated.

Figure 6:
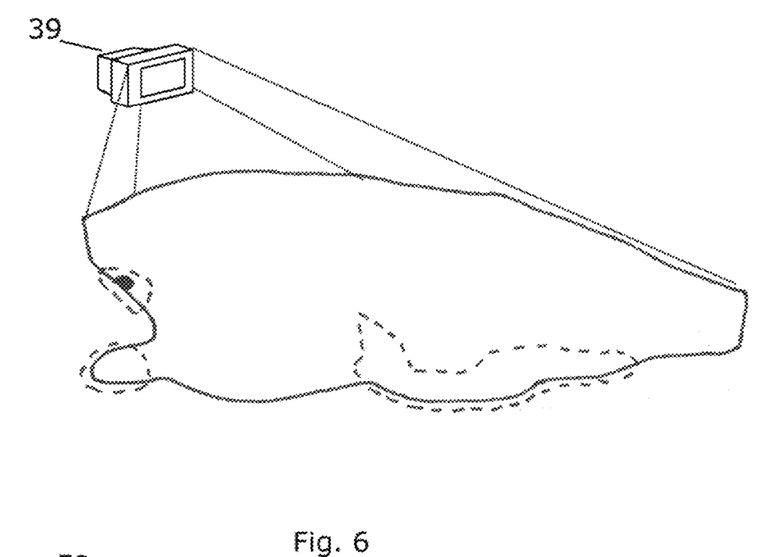
FIG. 6 illustrate cutting lines presented on a screen or on an item at a workstation as a processing guide.

FIG. 6 illustrates that cutting lines for fish fillets can be illustrated, such as on a monitor or directly on the food item. Cutting lines which are illustrated by dotted lines can be illustrated by laser light directly on the fish fillet. In the fillet illustrated, the larger encircled belly part was lighter than the surroundings, the smaller belly part at the head part of the fillet was also lighter than the rest of the fillet, and in the front section a black area was observed.

FIG. 7 illustrates some possible zones of a fish fillet, where some or all of these zones may be taken into consideration when determining whether a fish fillet complies with the required quality. Illustrated are zones of the back 51, 52, 53, the front 54, 56, the belly 59, 60, 61, 62, 63, the loin 55, 57 and the tail 58. Different identifiers may be allocated to one or more of these zones, and the quality of each zone may be determined in respect of the identifier being present or not i.e. a yes/no statement, being above a predetermined value and/or being determined in accordance to a minimum and maximum requirement for the selected quality type. The quality of each selected zone may be determined and an overall quality may be calculated as described elsewhere herein.

Numbered Embodiments

1. A food processing device (1) comprising:
    a conveyor system (2, 3, 31, 32) for conveying incoming food items in a conveying direction between an inlet (4, 5, 34) and an outlet (6, 35);
    a processor (8) configured for receiving image data representing images of the food items, the image data being received from an imaging system (9) and the processor being configured for processing the image data for determining a processing indicator for each of the incoming food items based on the image data; and
    a plurality of workstations (7, 33) arranged along the conveyor system;
    wherein the processing indicator indicates whether the food items need further processing or not and wherein the device comprises an identification structure configured to identify food items which are selected for further processing such that they are distinguished from food items not being selected for further processing based on the processing indicator.
2. The device according to embodiment 1, comprising an imaging system (9) arranged along the conveyor system for capturing image data of the incoming food items and for transmitting the image data to the processor.
3. The device according to embodiment 2, wherein the workstations (7, 33) are arranged downstream in the conveying direction relative to the imaging system (9).
4. The device according to any of the preceding embodiments, wherein the conveyor system (2, 3, 31, 32) comprises at least one conveyor line (2, 3, 31) extending along the workstations to allow items selected for further processing to be picked up by the workstations.
5. The device according to any of the preceding embodiments, comprising an object diverter (10, 36) configured to separate the food items selected for further processing from the other food items.
6. The device according to embodiments 4 and 5, wherein the object diverter (10) is configured to move the food items selected for further processing on the conveyor line extending along the workstations such that the food items selected for further processing are located in one location on the conveyor line extending along the workstations and such that the food items not selected for further processing are located in another location on the conveyor line extending along the workstations.

7. The device according to any of embodiments 5-6, comprising an activation controller configured to activate the object divert for selected food items based on the processing indicator for the selected food items and a pre-defined threshold value.

8. The device according to any of the preceding embodiments, wherein the processor (8) is configured to appoint the selected food items to a selected workstation of the plurality of workstations for the further processing of the selected food item.

9. The device according to any of the preceding embodiments, wherein the workstations (7, 33) have access to deliver food items at the outlet.

10. The device according to any of the preceding embodiments, wherein the conveyor system comprises a first conveyor line (31) and a second conveyor line (32), the first conveyor line extending between the inlet (34) and the outlet (35) and the second conveyor line (32) extending adjacent to the first conveyor line and being arranged to receive food items which are selected for further processing from the first conveyor line (31).

11. The device according to embodiment 10, wherein the second conveyor line (32) extends along the workstations (33) and allow items selected for further processing to be picked up by the workstations.

12. The device according to embodiment 11, wherein the workstations (33) arranged along the second conveyor line (32) are arranged such that they can release food items which have been processed further onto the first conveyor line (31).

13. The device according to any of embodiments 10-12 and 5, wherein the object diverter (36) is configured to move food items from the first conveyor line to the second conveyor line.

14. The device according to any of the preceding embodiments, wherein at least one of the workstations is a master workstation having access to the processing indicator.

15. The device according to any of the preceding embodiments, comprising a guidance controller configured to generate a processing guide for processing of the food items selected for further processing.

16. The device according to embodiment 15, wherein the guidance controller is in data communication with the imaging system and configured to generate the processing guide based on the captured image data.

17. The device according to embodiment 15 or 16, wherein the workstations are in data communication with the guidance controller and configured for receiving the processing guide from the guidance controller.

18. The device according to any of embodiments 15-17, wherein workstations are configured for manual processing of the food items and comprise an electronic display configured for visualising the processing guide.

19. The device according to any of embodiments 15-18, wherein the processing guide comprises a cutting pattern defining trimming of the food items.

20. The device according to any of embodiments 15-19, wherein the guidance controller is configured to generate a pattern of accepted food areas and rejected food areas on the food item based on the image data.

21. The device according to any of the preceding embodiments, wherein the controller is configured to receive a customer requirement for the food item and configured to select threshold value based on the customer requirement.

22. A method of processing food items in a device comprising:

a conveyor system for conveying incoming food items in a conveying direction between an inlet and an outlet;
a processor configured for receiving image data representing images of the food items, the image data being received from an imaging system and the processor being configured for processing the image data for determining a processing indicator for each of the incoming food items based on the image data, the processing indicator indicating whether the food items need further processing or not; and
a plurality of workstations arranged along the conveyor system;
the method comprising using the processing indicator for selecting food items needing to be processed and identifying the selected food items from other food items on the conveyer system.

23. The method according to embodiment 22, comprising the step of identifying the selected food items comprises allocating the food items relative to the food items not being selected.

24. The method according to embodiment 22 or 23 comprising processing the selected food items.

25. The method according to embodiment 24, wherein the processing is in accordance with a processing plan prepared based on the image data.

26. The method according to embodiment 24 or 25, wherein the processed food items are mixed with the food items not being selected.

The invention claimed is:

1. A food processing device comprising:
a conveyor system for conveying incoming food items in a conveying direction between an inlet and an outlet;
a processor configured for receiving image data representing images of the food items, the image data being received from an imaging system and the processor being configured for processing the image data for determining a processing indicator for each of the incoming food items based on the image data; and
a plurality of workstations arranged for trimming the food items and positioned along the conveyor system;
wherein the processing indicator is configured to indicate whether the food items need further processing, whether the food items do not need further processing, and whether the food items need to be discarded;
wherein the device comprises an identification structure configured to identify food items which are selected for further processing such that they are distinguished from food items not being selected for further processing based on the processing indicator;
wherein the conveyor system comprises at least one conveyor line extending along the workstations to allow items selected for further processing, including trimming, to be picked up by the workstations;
wherein the food processing device further comprises an object diverter arranged between the imaging system and the plurality of workstations and further configured to separate the food items selected for further processing from other food items;
wherein the object diverter is configured to move the food items selected for further processing on the conveyor line extending along the workstations such that the food items selected for further processing are located in one location on the conveyor line extending along the workstations and such that the food items not selected for further processing are located in another location on the conveyor line extending along the workstations.

2. The device according to claim 1, wherein the imaging system is arranged along the conveyor system for capturing image data of the incoming food items and for transmitting the image data to the processor.

3. The device according to claim 2, wherein the workstations are arranged downstream in the conveying direction relative to the imaging system.

4. The device according to claim 1, comprising a guidance controller configured to generate a processing guide for processing of the food items selected for further processing.

5. The device according to claim 4, wherein the guidance controller is in data communication with the imaging system and configured to generate the processing guide based on a captured image data.

6. The device according to claim 4, wherein the workstations are in data communication with the guidance controller and configured for receiving the processing guide from the guidance controller.

7. The device according to claim 4, wherein workstations are configured for manual processing of the food items and comprises an electronic display configured for visualizing the processing guide.

8. The device according to claim 4, wherein the processing guide comprises a cutting pattern defining trimming of the food items.

9. The device according to claim 4, wherein the guidance controller is configured to generate a pattern of accepted food areas and rejected food areas on the food item based on the image data.

10. The device according to claim 4, wherein the processing indicator is a result of comparison between the image data of the food items and image data of a desired end result for the food items.

11. The device according to claim 4, wherein the processing indicator is based on multiple predefined identifiers each having lower and upper limits to determine whether the food items need further processing or not.

12. The device according to claim 4, wherein the process indicator increases in number when a difference between a desired predefined identifier and an actual identifier of the food item increases.

13. The device according to claim 1, wherein the one location on the conveyor line is along an edge and at one side of the conveyor line of the conveyor system, and the other location is at another side of the conveyor line.

14. A food processing device comprising:
- a conveyor system for conveying incoming food items in a conveying direction between an inlet and an outlet;
- a processor configured for receiving image data representing images of the food items, the image data being received from an imaging system and the processor being configured for processing the image data for determining a processing indicator for each of the incoming food items based on the image data; and
- a plurality of workstations arranged for trimming the food items and positioned along the conveyor system;
- wherein the processing indicator is configured to indicate whether the food items need further processing, whether the food items do not need further processing, and whether the food items need to be discarded; and
- wherein the device comprises an identification structure configured to identify food items which are selected for further processing such that they are distinguished from food items not being selected for further processing based on the processing indicator;
- wherein the food processing device further comprises an object diverter arranged between the imaging system and the plurality of workstations and further configured to separate the food items selected for further processing from other food items;
- wherein the object diverter is configured to move the food items selected for further processing on a conveyor line of the conveyor system extending along the workstations such that the food items selected for further processing are located in one location on the conveyor line extending along the workstations and such that the food items not selected for further processing are located in another location on the conveyor line extending along the workstations.

* * * * *